US012211423B2

(12) United States Patent
Lim et al.

(10) Patent No.: US 12,211,423 B2
(45) Date of Patent: Jan. 28, 2025

(54) DISPLAY PANEL AND DISPLAY DEVICE INCLUDING THE SAME

(71) Applicant: Samsung Display Co., LTD., Yongin-si (KR)

(72) Inventors: Danwon Lim, Yongin-si (KR); Hyunjoon Kim, Yongin-si (KR); Jaeyong Jang, Yongin-si (KR); Bon-Yong Koo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/391,087

(22) Filed: Dec. 20, 2023

(65) Prior Publication Data

US 2024/0282240 A1 Aug. 22, 2024

(30) Foreign Application Priority Data

Feb. 17, 2023 (KR) ........................ 10-2023-0021505

(51) Int. Cl.
*G09G 3/20* (2006.01)
*G09G 3/3233* (2016.01)

(52) U.S. Cl.
CPC ......... *G09G 3/2096* (2013.01); *G09G 3/3233* (2013.01); *G09G 2300/0426* (2013.01); *G09G 2300/0819* (2013.01); *G09G 2300/0852* (2013.01); *G09G 2300/0861* (2013.01); *G09G 2310/08* (2013.01)

(58) Field of Classification Search
CPC ............... G09G 3/2096; G09G 3/3233; G09G 2300/0426; G09G 2300/0819; G09G 2300/0852; G09G 2300/0861; G09G 2310/08
See application file for complete search history.

(56) References Cited

U.S. PATENT DOCUMENTS

| | | | | |
|---|---|---|---|---|
| RE49,899 E * | 4/2024 | Lee | G09G 3/2003 | |
| 2005/0017934 A1* | 1/2005 | Chung | G09G 3/3233 | 345/82 |
| 2007/0040772 A1* | 2/2007 | Kim | G09G 3/3233 | 345/76 |
| 2009/0167648 A1* | 7/2009 | Jeon | G09G 3/3266 | 345/76 |
| 2010/0265166 A1* | 10/2010 | Kang | G09G 3/3233 | 345/76 |

(Continued)

FOREIGN PATENT DOCUMENTS

KR 10-0624137 9/2006

*Primary Examiner* — Benyam Ketema
(74) *Attorney, Agent, or Firm* — Lewis Roca Rothgerber Christie LLP

(57) ABSTRACT

A display panel includes: sub-pixels each including a storage capacitor configured to have a data voltage written thereto; a capacitor node line connected to the storage capacitor of at least one of the sub-pixels; a compensation reference voltage line configured to receive a compensation reference voltage; a first power supply voltage line configured to receive a first power supply voltage; a first connection transistor configured to connect the compensation reference voltage line to the capacitor node line based on an emission signal; and a second connection transistor configured to connect the first power supply voltage line to the capacitor node line based on the emission signal.

20 Claims, 12 Drawing Sheets

(56) References Cited

U.S. PATENT DOCUMENTS

| | | | | |
|---|---|---|---|---|
| 2010/0309187 | A1* | 12/2010 | Kang | G09G 3/3233 345/76 |
| 2011/0025659 | A1* | 2/2011 | Kwak | G09G 3/3233 345/80 |
| 2013/0088417 | A1* | 4/2013 | Kim | G09G 3/3233 345/82 |
| 2014/0062331 | A1* | 3/2014 | Nam | G09G 3/3233 315/226 |
| 2015/0379956 | A1* | 12/2015 | Nonaka | G09G 3/325 315/172 |
| 2016/0086545 | A1* | 3/2016 | Matsueda | G09G 3/2096 345/212 |
| 2016/0104423 | A1* | 4/2016 | Park | G09G 3/3233 345/78 |
| 2017/0331061 | A1* | 11/2017 | Lee | H10B 12/48 |
| 2017/0345883 | A1* | 11/2017 | Song | H10K 59/123 |
| 2017/0365647 | A1* | 12/2017 | Choi | G09G 3/3258 |
| 2018/0005576 | A1* | 1/2018 | Yoon | G09G 3/3233 |
| 2018/0122297 | A1* | 5/2018 | Nonaka | G09G 3/3233 |
| 2018/0151650 | A1* | 5/2018 | Ha | H01L 27/124 |
| 2018/0158406 | A1* | 6/2018 | Kim | G09G 3/3283 |
| 2018/0166516 | A1* | 6/2018 | Chai | H10K 59/131 |
| 2018/0174514 | A1* | 6/2018 | Lee | G09G 3/3233 |
| 2019/0066598 | A1* | 2/2019 | Kim | G09G 3/3233 |
| 2019/0164491 | A1* | 5/2019 | Kim | H10K 59/131 |
| 2020/0175911 | A1* | 6/2020 | Ko | G09G 3/325 |
| 2021/0272521 | A1* | 9/2021 | Yoon | H10K 59/1216 |
| 2022/0189402 | A1* | 6/2022 | Wang | G09G 3/3266 |
| 2024/0071307 | A1* | 2/2024 | Lee | G09G 3/3233 |

* cited by examiner

DISPLAY PANEL AND DISPLAY DEVICE INCLUDING THE SAME

CROSS-REFERENCE TO RELATED APPLICATION

The present application claims priority to and the benefit of Korean Patent Application No. 10-2023-0021505, filed on Feb. 17, 2023, in the Korean Intellectual Property Office, the entire disclosure of which is incorporated herein by reference.

BACKGROUND

1. Field

Aspects of some embodiments of the present disclosure relate to a display panel and a display device including the display panel.

2. Description of the Related Art

In general, a display device may include a display panel, a gate driver, a data driver, and a timing controller. The display panel may include a plurality of gate lines, a plurality of data lines, and a plurality of sub-pixels electrically connected to the gate lines and the data lines. The gate driver may provide gate signals to the gate lines, and the data driver may provide data voltages to the data lines. The timing controller may control the gate driver and the data driver.

Regarding the display device, a difference in characteristics such as a threshold voltage of a driving transistor may occur for each of the sub-pixels due to manufacturing process variations and the like. Therefore, in order to relatively improve display quality, the threshold voltage of the driving transistor may be compensated for for each of the sub-pixels.

The above information disclosed in this Background section is only for enhancement of understanding of the background and therefore the information discussed in this Background section does not necessarily constitute prior art.

SUMMARY

Aspects of some embodiments of the present disclosure relate to a display panel and a display device including the display panel. For example, aspects of some embodiments of the present disclosure relate to a display panel including a sub-pixel having a storage capacitor and a display device including the display panel.

Aspects of some embodiments include a display panel capable of applying a compensation reference voltage or a first power supply voltage to a storage capacitor.

According to some embodiments of the present disclosure a display device includes a display panel.

However, the characteristics of embodiments according to the present disclosure are not limited thereto. Thus, the characteristics of embodiments according to the present disclosure may be extended without departing from the spirit and the scope of embodiments according to the present disclosure.

According to some embodiments, a display panel may include sub-pixels each including a storage capacitor to which a data voltage is written, a capacitor node line connected to the storage capacitor of at least one of the sub-pixels, a compensation reference voltage line to which a compensation reference voltage is applied, a first power supply voltage line to which a first power supply voltage is applied, a first connection transistor configured to connect the compensation reference voltage line to the capacitor node line in response to an emission signal, and a second connection transistor configured to connect the first power supply voltage line to the capacitor node line in response to the emission signal.

According to some embodiments, the second connection transistor may be turned off when the first connection transistor is turned on, and the first connection transistor may be turned off when the second connection transistor is turned on.

According to some embodiments, each of the sub-pixels may include the storage capacitor, a driving transistor configured to generate a driving current, a write transistor configured to write the data voltage in response to a write gate signal, a compensation transistor configured to diode-connect the driving transistor in response to a compensation gate signal, a first emission transistor configured to provide the first power supply voltage to the driving transistor in response to the emission signal, and a light emitting element configured to receive the driving current to emit a light.

According to some embodiments, the storage capacitor may include a first electrode connected to a control electrode of the driving transistor and a second electrode connected to the capacitor node line.

According to some embodiments, in a data write period in which the data voltage is written, the write transistor, the compensation transistor, and the first connection transistor may be turned on.

According to some embodiments, in an emission period in which the light emitting element emits the light, the second connection transistor may be turned on.

According to some embodiments, each of the sub-pixels may further include a first initialization transistor configured to provide a first initialization voltage to the storage capacitor in response to an initialization gate signal, a second initialization transistor configured to provide a second initialization voltage to the light emitting element in response to a bias gate signal, a second emission transistor configured to provide the driving current to the light emitting element in response to the emission signal, and a bias transistor configured to provide a bias voltage to the driving transistor in response to the bias gate signal.

According to some embodiments, at least one of pixels including the sub-pixels may be between the compensation reference voltage line and the first power supply voltage line.

According to some embodiments, the compensation reference voltage line or the first power supply voltage line may be between the sub-pixels within at least one of pixels including the sub-pixels.

According to some embodiments, the display panel may further include a display region configured to display an image and a peripheral region that is adjacent to the display region. In addition, the compensation reference voltage line and the first power supply voltage line may be in the display region.

According to some embodiments, the display panel may further include a display region configured to display an image and a peripheral region that is adjacent to the display region. In addition, according to some embodiments, the compensation reference voltage line and the first power supply voltage line may be in the peripheral region.

According to some embodiments, the first connection transistor and the second connection transistor may be in the peripheral region.

According to some embodiments, the display panel may further include a second power supply voltage line extending in a direction intersecting the first power supply voltage line, the first power supply voltage being applied to the second power supply voltage line.

According to some embodiments, a display panel may include sub-pixels each including a storage capacitor to which a data voltage is written, a capacitor node line connected to the storage capacitor of at least one of the sub-pixels, a plurality of compensation reference voltage lines to which a compensation reference voltage is applied, a plurality of first power supply voltage lines to which a first power supply voltage is applied, the first power supply voltage lines being arranged alternately with the compensation reference voltage lines, a plurality of first connection transistors configured to connect the compensation reference voltage lines to the capacitor node line in response to an emission signal, and a plurality of second connection transistors configured to connect the first power supply voltage lines to the capacitor node line in response to the emission signal.

According to some embodiments, the second connection transistors may be turned off when the first connection transistors are turned on, and the first connection transistors may be turned off when the second connection transistors are turned on.

According to some embodiments, each of the sub-pixels may include the storage capacitor, a driving transistor configured to generate a driving current, a write transistor configured to write the data voltage in response to a write gate signal, a compensation transistor configured to diode-connect the driving transistor in response to a compensation gate signal, a first emission transistor configured to provide the first power supply voltage to the driving transistor in response to the emission signal, and a light emitting element configured to receive the driving current to emit a light.

According to some embodiments, the storage capacitor may include a first electrode connected to a control electrode of the driving transistor and a second electrode connected to the capacitor node line.

According to some embodiments, in a data write period in which the data voltage is written, the write transistor, the compensation transistor, and the first connection transistors may be turned on.

According to some embodiments, in an emission period in which the light emitting element emits the light, the second connection transistors may be turned on.

According to some embodiments, a display device may include a display panel including pixels each including sub-pixels, a data driver configured to provide a data voltage to the sub-pixels, an emission driver configured to provide an emission signal to the sub-pixels, and a timing controller configured to control the data driver and the emission driver. In addition, according to some embodiments, each of the sub-pixels may include a storage capacitor to which the data voltage is written. Further, according to some embodiments, the display panel may include a capacitor node line connected to the storage capacitor of at least one of the sub-pixels, a compensation reference voltage line to which a compensation reference voltage is applied, a first power supply voltage line to which a first power supply voltage is applied, a first connection transistor configured to connect the compensation reference voltage line to the capacitor node line in response to the emission signal, and a second connection transistor configured to connect the first power supply voltage line to the capacitor node line in response to the emission signal.

Therefore, a display panel according to embodiments may include: sub-pixels each including a storage capacitor to which a data voltage is written; a capacitor node line connected to the storage capacitor of at least one of the sub-pixels; a compensation reference voltage line to which a compensation reference voltage is applied; a first power supply voltage line to which a first power supply voltage is applied; a first connection transistor configured to connect the compensation reference voltage line to the capacitor node line in response to an emission signal; and a second connection transistor configured to connect the first power supply voltage line to the capacitor node line in response to the emission signal, so that the compensation reference voltage or the first power supply voltage can be selectively applied to the storage capacitor. Accordingly, relatively fewer transistors may be used than a case where transistors configured to selectively apply the compensation reference voltage or the first power supply voltage are provided for each of the sub-pixels.

In addition, the display panel may apply a compensation reference voltage to a storage capacitor when a threshold voltage of a driving transistor is compensated for, so that an influence caused by a voltage drop (IR drop) of a first power supply voltage can be minimized when the threshold voltage of the driving transistor is compensated for.

However, the characteristics of embodiments according to the present disclosure are not limited thereto. Thus, the characteristics of embodiments according to the present disclosure may be extended without departing from the spirit and the scope of embodiments according to the present disclosure.

DETAILED DESCRIPTION

Hereinafter, embodiments of the present disclosure will be explained in more detail with reference to the accompanying drawings.

Figure 1:
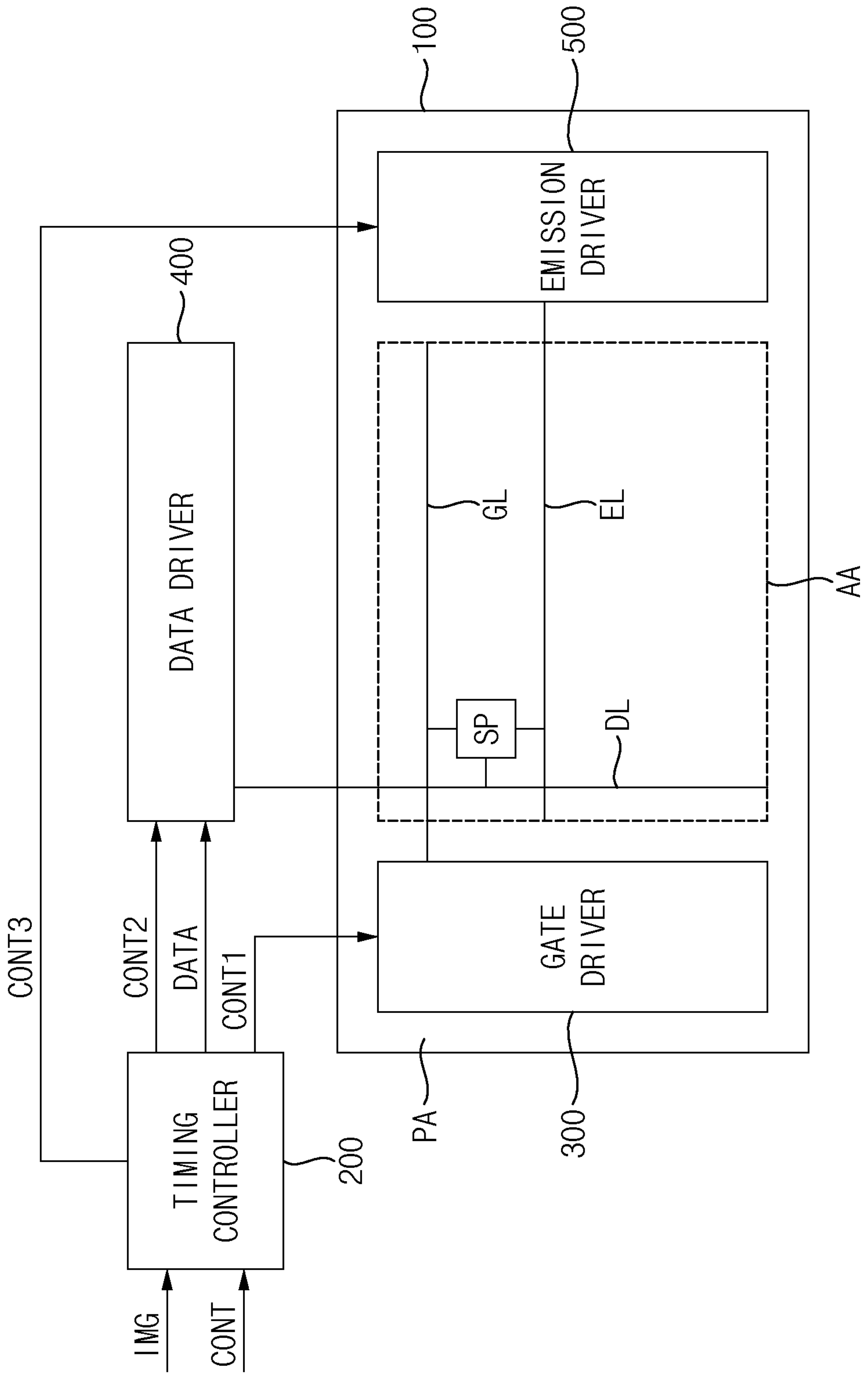
FIG. 1 is a block diagram illustrating a display device according to some embodiments.

FIG. 1 is a block diagram illustrating a display device according to some embodiments.

Referring to FIG. 1, a display device may include a display panel 100, a timing controller 200, a gate driver 300, a data driver 400, and an emission driver 500. According to some embodiments, the timing controller 200 and the data driver 400 may be integrated on one chip.

The display panel 100 may include a display region AA configured to display images, and a peripheral region PA that is adjacent to (e.g., in a periphery or outside a footprint of) the display region AA. According to some embodiments, the gate driver 300 and the emission driver 500 may be mounted on the peripheral region PA.

The display panel 100 may include a plurality of gate lines GL, a plurality of data lines DL, a plurality of emission lines EL, and a plurality of sub-pixels SP electrically connected to the gate lines GL, the data lines DL, and the emission lines EL. The gate lines GL and the data lines DL may extend in directions intersecting each other. The emission lines EL and the data lines DL may extend in directions intersecting each other.

The timing controller 200 may receive input image data IMG and an input control signal CONT from a host processor (e.g., a graphic processing unit (GPU), etc.). For example, the input image data IMG may include red image data, green image data, and blue image data. According to some embodiments, the input image data IMG may further include white image data. As another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The timing controller 200 may generate a first control signal CONT1, a second control signal CONT2, a third control signal CONT3, and a data signal DATA based on the input image data IMG and the input control signal CONT.

The timing controller 200 may generate the first control signal CONT1 for controlling an operation of the gate driver 300 based on the input control signal CONT to output the generated first control signal CONT1 to the gate driver 300. The first control signal CONT1 may include a vertical start signal and a gate clock signal.

The timing controller 200 may generate the second control signal CONT2 for controlling an operation of the data driver 400 based on the input control signal CONT to output the generated second control signal CONT2 to the data driver 400. The second control signal CONT2 may include a horizontal start signal and a load signal.

The timing controller 200 may receive the input image data IMG and the input control signal CONT to generate the data signal DATA. The timing controller 200 may output the data signal DATA to the data driver 400.

The timing controller 200 may generate the third control signal CONT3 for controlling an operation of the emission driver 500 based on the input control signal CONT to output the generated third control signal CONT3 to the emission driver 500. The third control signal CONT3 may include a vertical start signal and an emission clock signal.

The gate driver 300 may generate gate signals for driving the gate lines GL in response to the first control signal CONT1 received from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may generate data voltages obtained by converting the data signal DATA into an analog voltage. The data driver 400 may output the data voltages to the data lines DL.

The emission driver 500 may generate emission signals for driving the emission lines EL in response to the third control signal CONT3 received from the timing controller 200. The emission driver 500 may output the emission signals to the emission lines EL. For example, the emission driver 500 may sequentially output the emission signals to the emission lines EL.

Figure 2:
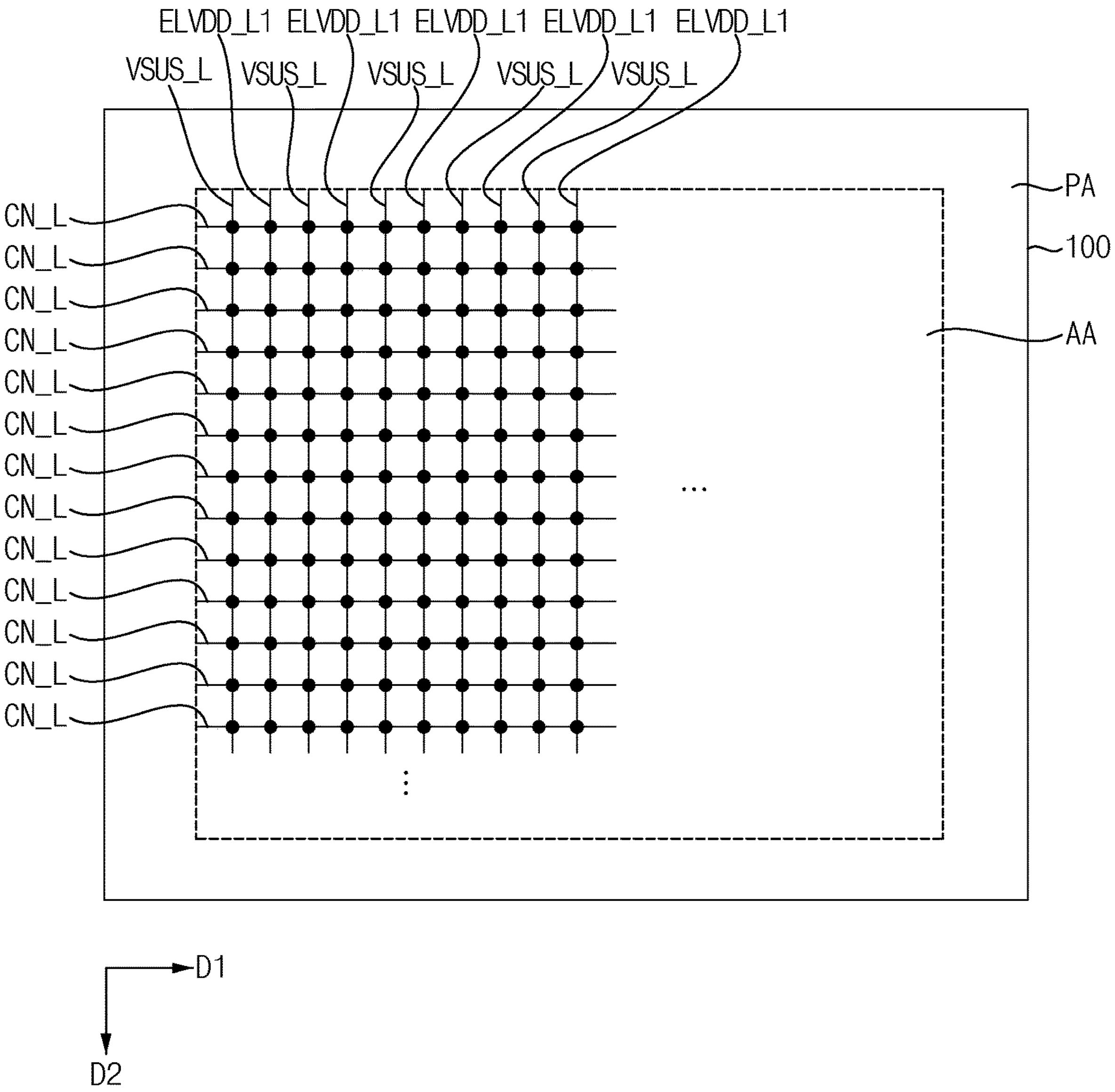
FIG. 2 is a diagram illustrating an example of a display panel of the display device of FIG. 1.
Figure 3:
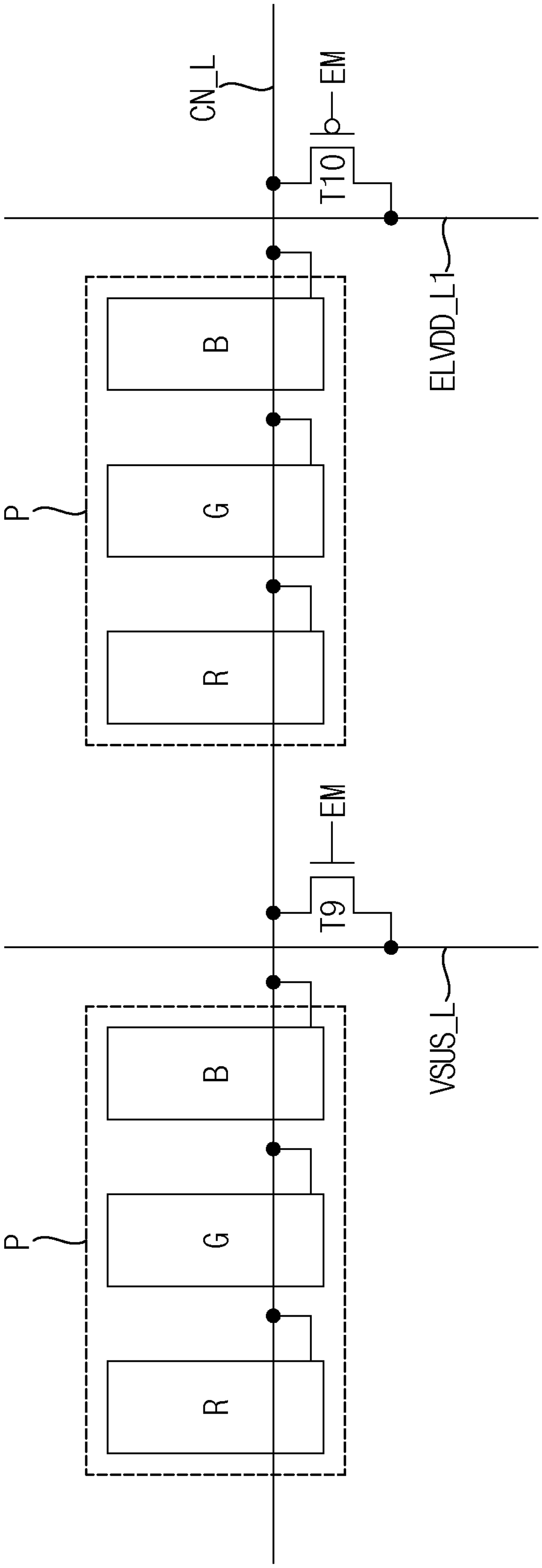
FIG. 3 is a diagram illustrating an example in which a compensation reference voltage line and a first power supply voltage line of FIG. 2 are connected to sub-pixels.
Figure 4:
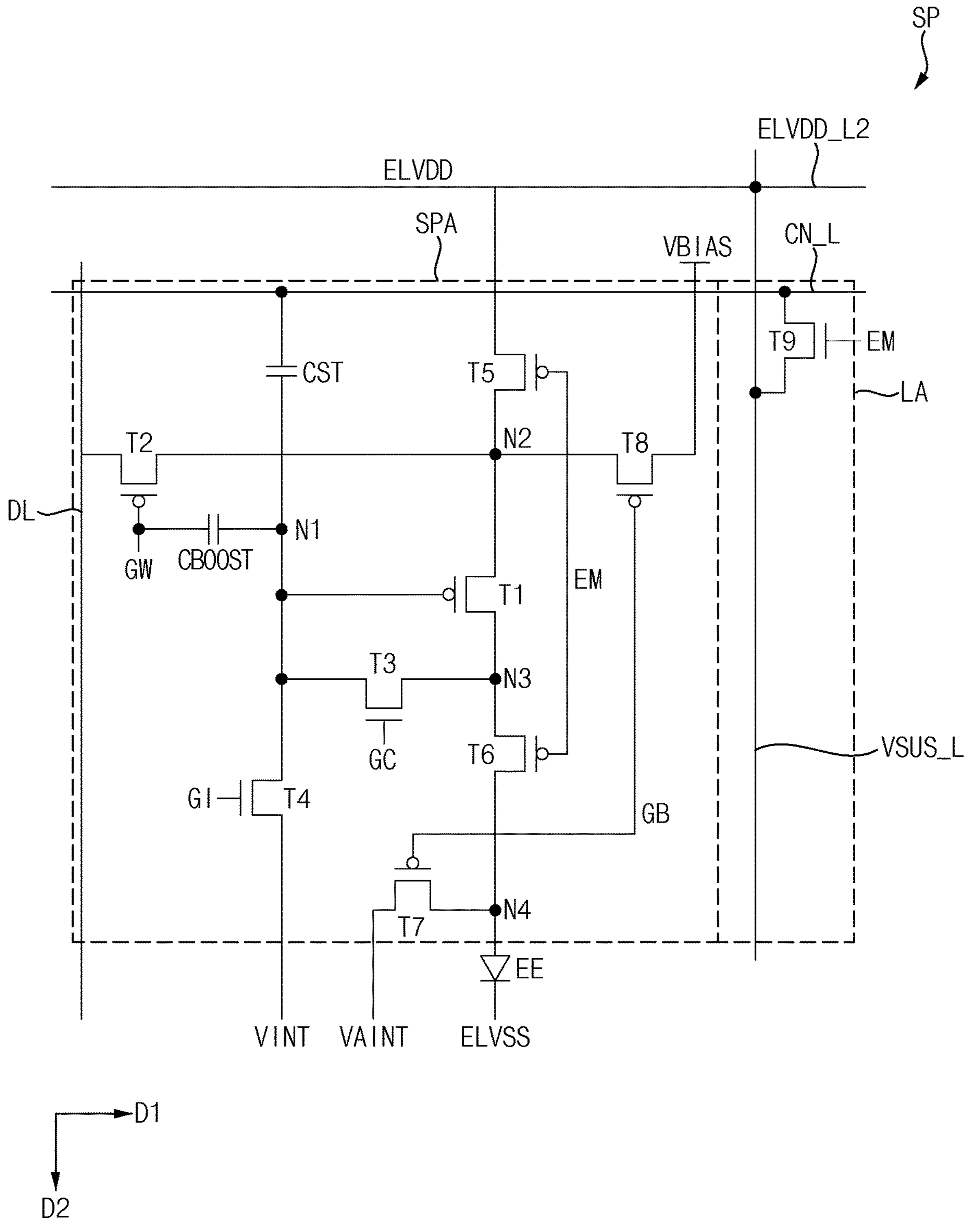
FIG. 4 is a circuit diagram illustrating an example of a sub-pixel that is adjacent to a compensation reference voltage line of the display device of FIG. 1.
Figure 5:
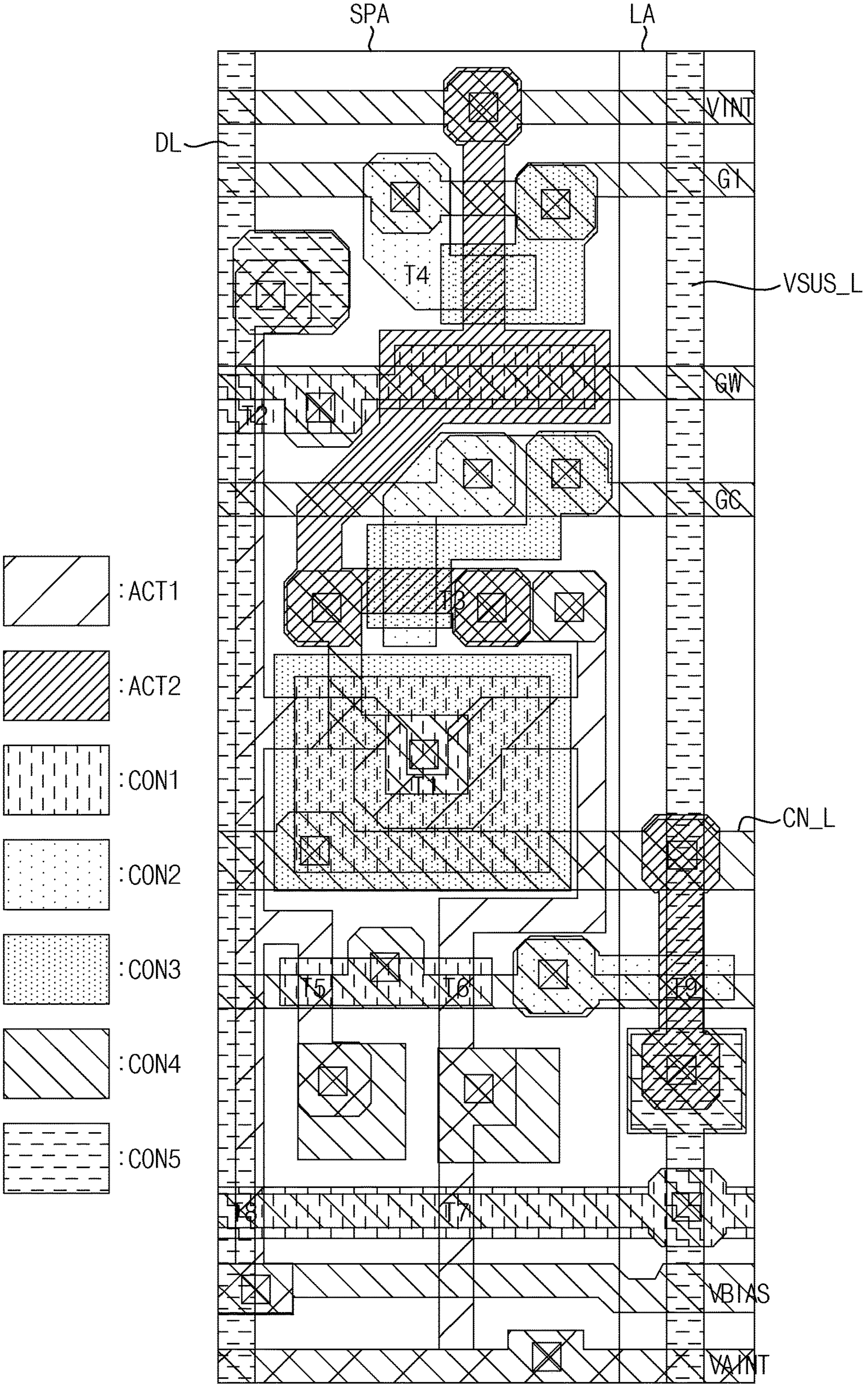
FIG. 5 is a layout diagram illustrating the sub-pixel of FIG. 4.
Figure 6:
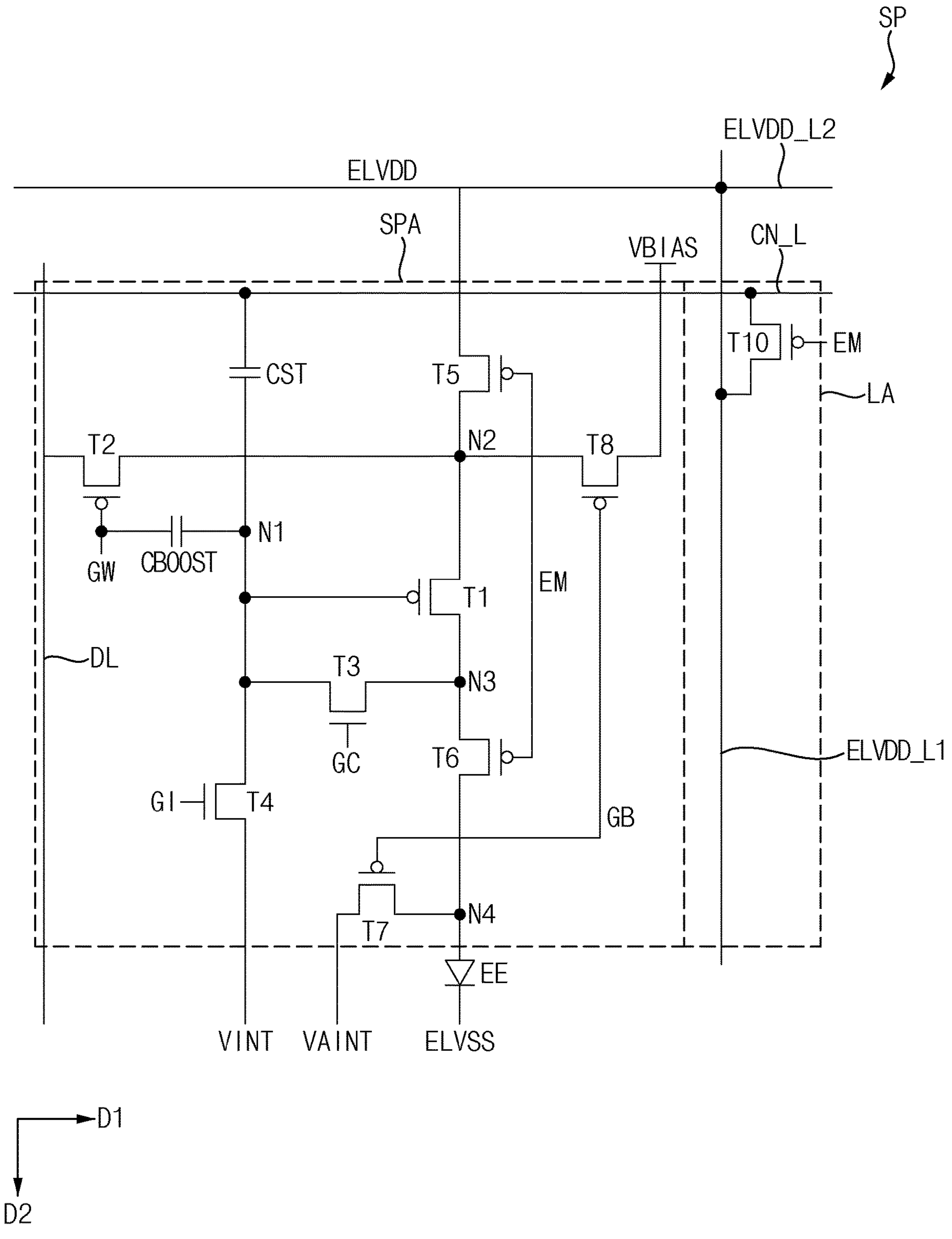
FIG. 6 is a circuit diagram illustrating an example of a sub-pixel that is adjacent to a first power supply voltage line of the display device of FIG. 1.
Figure 7:
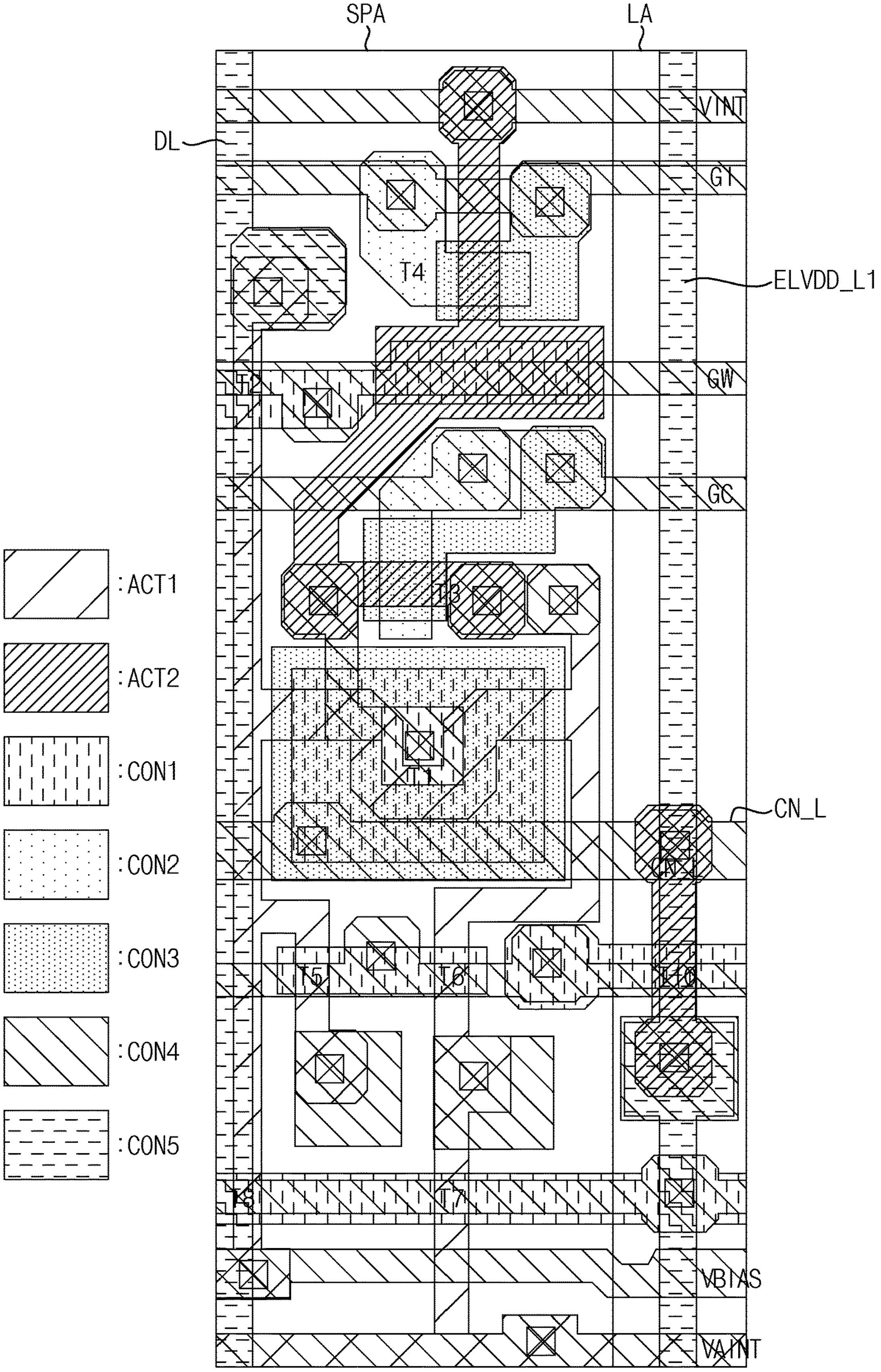
FIG. 7 is a layout diagram illustrating the sub-pixel of FIG. 6.

FIG. 2 is a diagram illustrating an example of a display panel 100 of the display device of FIG. 1, FIG. 3 is a diagram illustrating an example in which a compensation reference voltage line VSUS_L and a first power supply voltage line ELVDD_L1 of FIG. 2 are connected to sub-pixels SP, FIG. 4 is a circuit diagram illustrating an example of a sub-pixel SP that is adjacent to a compensation reference voltage line VSUS_L of the display device of FIG. 1, FIG. 5 is a layout diagram illustrating the sub-pixel SP of FIG. 4, FIG. 6 is a circuit diagram illustrating an example of a sub-pixel SP that is adjacent to a first power supply voltage line ELVDD_L1 of the display device of FIG. 1, and FIG. 7 is a layout diagram illustrating the sub-pixel SP of FIG. 6.

In FIGS. 2, 3, 5, and 7, a second power supply voltage line ELVDD_L2 has been omitted for convenience of description. In addition, in FIG. 2, a first connection transistor T9 and a second connection transistor T10 have been omitted for convenience of description. In other words, although a capacitor node line CN_L, the compensation reference voltage line VSUS_L, and the first power supply voltage line ELVDD_L1 have been shown in FIG. 2 as being directly connected to each other, the capacitor node line CN_L, the compensation reference voltage line VSUS_L, and the first power supply voltage line ELVDD_L1 may be connected to each other through the first and second connection transistors T9 and T10.

Referring to FIGS. 1 to 4, the display panel 100 may include: a capacitor node line CN_L connected to a storage capacitor CST of at least one of the sub-pixels SP; a compensation reference voltage line VSUS_L to which a compensation reference voltage VSUS is applied; and a first power supply voltage line ELVDD_L1 to which a first power supply voltage ELVDD is applied.

Referring to FIGS. 2 and 3, according to some embodiments, the compensation reference voltage line VSUS_L and the first power supply voltage line ELVDD_L1 may be located in the display region AA. In addition, the first connection transistor T9 and the second connection transistor T10 may be located in the display region AA.

For example, the capacitor node line CN_L may be connected to the sub-pixels SP of one sub-pixel row. For example, the capacitor node line CN_L may extend in a first direction D1. In this case, the sub-pixel row may be a row of the sub-pixels SP in the first direction D1.

For example, the compensation reference voltage line VSUS_L may extend in a second direction D2 intersecting the first direction D1. For example, the first power supply voltage line ELVDD_L1 may extend in the second direction D2.

Therefore, the capacitor node line CN_L may form a mesh with the compensation reference voltage line VSUS_L and the first power supply voltage line ELVDD_L1.

According to some embodiments, the first power supply voltage lines ELVDD_L1 may be arranged alternately with the compensation reference voltage lines VSUS_L. According to some embodiments, at least one of pixels P including the sub-pixels SP may be located between the compensation reference voltage line VSUS_L and the first power supply voltage line ELVDD_L1. For example, the compensation reference voltage line VSUS_L or the first power supply voltage line ELVDD_L1 may be located between pixel columns. In this case, the pixel column may be a column of the pixels P in the second direction D2.

For example, the sub-pixels SP may include a first color sub-pixel R configured to display a first color, a second color sub-pixel G configured to display a second color, and a third color sub-pixel B configured to display a third color. For example, the first color may be a red color, the second color may be a green color, and the third color may be a blue color.

For example, as shown in FIG. 3, the pixel P may have an RGB stripe structure. In this case, one pixel P may include one first color sub-pixel R, one second color sub-pixel G, and one third color sub-pixel B.

Although the pixel P has been illustrated in the present embodiments as having the RGB stripe structure, embodiments according to the present disclosure are not limited to the structure of the pixel P.

Referring to FIGS. 1 and 3 to 7, the display panel 100 may include: a first connection transistor T9 configured to connect the compensation reference voltage line VSUS_L to the capacitor node line CN_L in response to an emission signal EM; and a second connection transistor T10 configured to connect the first power supply voltage line ELVDD_L1 to the capacitor node line CN_L in response to the emission signal EM.

For example, as shown in FIG. 5, the first connection transistor T9 may be located in a portion in which the compensation reference voltage line VSUS_L and the capacitor node line CN_L intersect each other. For example, as shown in FIG. 7, the second connection transistor T10 may be located in a portion in which the first power supply voltage line ELVDD_L1 and the capacitor node line CN_L intersect each other.

The second connection transistor T10 may be turned off when the first connection transistor T9 is turned on, and the first connection transistor T9 may be turned off when the second connection transistor T10 is turned on. For example, the first connection transistor T9 and the second connection transistor T10 may be implemented in mutually different types. Operations of the first and second connection transistors T9 and T10 will be described in detail below.

Each of the sub-pixels SP may include: a driving transistor T1 configured to generate a driving current; a write transistor T2 configured to write data voltages in response to a write gate signal GW; a compensation transistor T3 configured to diode-connect the driving transistor T1 in response to a compensation gate signal GC; a first emission transistor T5 configured to provide a first power supply voltage ELVDD to the driving transistor T1 in response to the emission signal EM; and a light emitting element EE configured to receive the driving current to emit a light.

For example, the first color sub-pixel R may include a light emitting element EE configured to display the first color, the second color sub-pixel G may include a light emitting element EE configured to display the second color, and the third color sub-pixel B may include a light emitting element EE configured to display the third color.

For example, the first emission transistor T5 may receive the first power supply voltage ELVDD through the second power supply voltage line ELVDD_L2. The second power supply voltage line ELVDD_L2 may be connected to the first power supply voltage line ELVDD_L1, and may extend in a direction intersecting the first power supply voltage line ELVDD_L1 (i.e., the second direction D2).

Each of the sub-pixels SP may include: a first initialization transistor T4 configured to provide a first initialization voltage VINT to the storage capacitor CST in response to an initialization gate signal GI; a second initialization transistor T7 configured to provide a second initialization voltage VAINT to the light emitting element EE in response to a bias gate signal GB; a second emission transistor T6 configured to provide the driving current to the light emitting element EE in response to the emission signal EM; and a bias transistor T8 configured to provide a bias voltage VBIAS to the driving transistor T1 in response to the bias gate signal.

The storage capacitor CST may include a first electrode connected to a control electrode of the driving transistor T1, and a second electrode connected to the capacitor node line CN_L.

For example, each of the sub-pixels SP may include: a driving transistor T1 including a control electrode connected to a first node N1, a first electrode connected to a second node N2, and a second electrode connected to a third node N3; a write transistor T2 including a control electrode configured to receive a write gate signal GW, a first electrode connected to a data line DL, and a second electrode connected to the first node N1; a compensation transistor T3 including a control electrode configured to receive a compensation gate signal GC, a first electrode connected to the third node N3, and a second electrode connected to the first node N1; a first initialization transistor T4 including a control electrode configured to receive an initialization gate signal GI, a first electrode configured to receive a first initialization voltage VINT, and a second electrode connected to the first node N1; a first emission transistor T5 including a control electrode configured to receive an emission signal EM, a first electrode configured to receive a first power supply voltage ELVDD (e.g., a high power supply voltage), and a second electrode connected to the second node N2; a second emission transistor T6 including a control electrode configured to receive the emission signal EM, a first electrode connected to the third node N3, and a second electrode connected to a fourth node N4; a second initialization transistor T7 including a control electrode configured to receive a bias gate signal GB, a first electrode configured to receive a second initialization voltage VAINT, and a second electrode connected to the fourth node N4; a bias transistor T8 including a control electrode configured to receive the bias gate signal GB, a first electrode configured to receive a bias voltage VBIAS, and a second electrode connected to the second node N2; a storage capacitor including a first electrode connected to the first node N1, and a second electrode connected to a capacitor node line CN_L; a boost capacitor CBOOST including a first electrode configured to receive the write gate signal, and a second electrode connected to the first node N1; and a light emitting element EE including a first electrode connected to the fourth node N4, and a second electrode configured to receive a second power supply voltage ELVSS (e.g., a low power supply voltage).

Although the bias gate signal GB has been illustrated in the present embodiments as being a gate signal generated by the gate driver 300, the bias gate signal GB may be generated by the emission driver 500.

The driving transistor T1, the write transistor T2, the first emission transistor T5, the second emission transistor T6, the second initialization transistor T7, and the bias transistor T8 may be implemented as p-channel metal oxide semiconductor (PMOS) transistors. In this case, a low voltage level may be an activation level, and a high voltage level may be an inactivation level. For example, when a signal applied to a control electrode of the PMOS transistor has the low voltage level, the PMOS transistor may be turned on. For example, when the signal applied to the control electrode of the PMOS transistor has the high voltage level, the PMOS transistor may be turned off.

The compensation transistor T3 and the first initialization transistor T4 may be implemented as n-channel metal oxide semiconductor (NMOS) transistors. In this case, a low voltage level may be an inactivation level, and a high voltage level may be an activation level. For example, when a signal applied to a control electrode of the NMOS transistor has the low voltage level, the NMOS transistor may be turned off. For example, when the signal applied to the control electrode of the NMOS transistor has the high voltage level, the NMOS transistor may be turned on. In other words, the activation level and the inactivation level may be determined depending on a type of the transistor.

However, embodiments according to the present disclosure are not limited thereto. For example, the driving transistor T1, the write transistor T2, the first emission transistor T5, the second emission transistor T6, the second initialization transistor T7, and the bias transistor T8 may be implemented as NMOS transistors. For example, the compensation transistor T3 and the first initialization transistor T4 may be implemented as PMOS transistors.

For example, as shown in FIGS. 5 and 7, the sub-pixel SP may be located in a sub-pixel region SPA, and the compensation reference voltage line VSUS_L and the first power supply voltage line ELVDD_L1 may be located in a wiring region LA that is adjacent to the sub-pixel region SPA.

For example, as shown in FIGS. 5 and 7, a first active layer ACT1 may form the first and second electrodes of the driving transistor T1, the first and second electrodes of the write transistor T2, the first and second electrodes of the first emission transistor T5, the first and second electrodes of the second emission transistor T6, and the first and second electrodes of the second initialization transistor T7.

For example, as shown in FIGS. 5 and 7, a second active layer ACT2 may form the first and second electrodes of the compensation transistor T3, the first and second electrodes of the first initialization transistor T4, and the second electrode of the boost capacitor CBOOST.

For example, as shown in FIGS. 5 and 7, a first conductive layer CON1 may form the control electrode of the driving transistor T1, the control electrode of the write transistor T2, the control electrode of the first emission transistor T5, the control electrode of the second emission transistor T6, the control electrode of the second initialization transistor T7, the first electrode of the storage capacitor CST, and the first electrode of the boost capacitor CBOOST.

For example, as shown in FIGS. 5 and 7, a second conductive layer CON2 may form the control electrode of the compensation transistor T3 and the control electrode of the first initialization transistor T4.

For example, as shown in FIGS. 5 and 7, a third conductive layer CON3 may form the second electrode of the storage capacitor CST.

For example, as shown in FIGS. 5 and 7, a fourth conductive layer CON4 may form lines to which the gate signals GW, GC, GI, and GB, the emission signal EM, the initialization voltages VINT and VAINT, and the bias voltage VBIAS are applied.

For example, as shown in FIGS. 5 and 7, a fifth conductive layer CON5 may form the data line DL.

For example, as shown in FIG. 5, the second active layer ACT2 may form a first electrode and a second electrode of the first connection transistor T9, the second conductive layer CON2 may form a control electrode of the first connection transistor T9, and the fifth conductive layer CON5 may form the compensation reference voltage line VSUS_L.

For example, as shown in FIG. 7, the first active layer ACT1 may form a first electrode and a second electrode of the second connection transistor T10, the first conductive layer CON1 may form a control electrode of the second connection transistor T10, and the fifth conductive layer CON5 may form the first power supply voltage line ELVDD_L1.

As described above, the first connection transistor T9 and the second connection transistor T10 may be implemented in mutually different types. For example, when the first connection transistor T9 is an NMOS transistor, the second connection transistor T10 may be a PMOS transistor. For example, when the first connection transistor T9 is a PMOS transistor, the second connection transistor T10 may be an NMOS transistor.

According to some embodiments, the first connection transistor T9 and the first and second emission transistors T5 and T6 may be implemented in mutually different types. According to some embodiments, the second connection transistor T10 and the first and second emission transistors T5 and T6 may be implemented in the same type. Accordingly, the compensation reference voltage VSUS may be applied to the second electrode of the storage capacitor CST when a threshold voltage of the driving transistor T1 is compensated for, and the first power supply voltage ELVDD may be applied to the second electrode of the storage capacitor CST when the sub-pixel SP emits a light.

The driving current may flow through the first power supply voltage line ELVDD_L1. Meanwhile, a current may not flow through the compensation reference voltage line VSUS_L. Therefore, a voltage drop may occur in the first power supply voltage line ELVDD_L1, whereas a voltage drop may not occur in the compensation reference voltage line VSUS_L. Therefore, the capacitor node line CN_L may be connected to the compensation reference voltage line VSUS_L when the threshold voltage of the driving transistor T1 is compensated for, so that an influence caused by the voltage drop may be minimized when the threshold voltage of the driving transistor T1 is compensated for.

Figure 8:
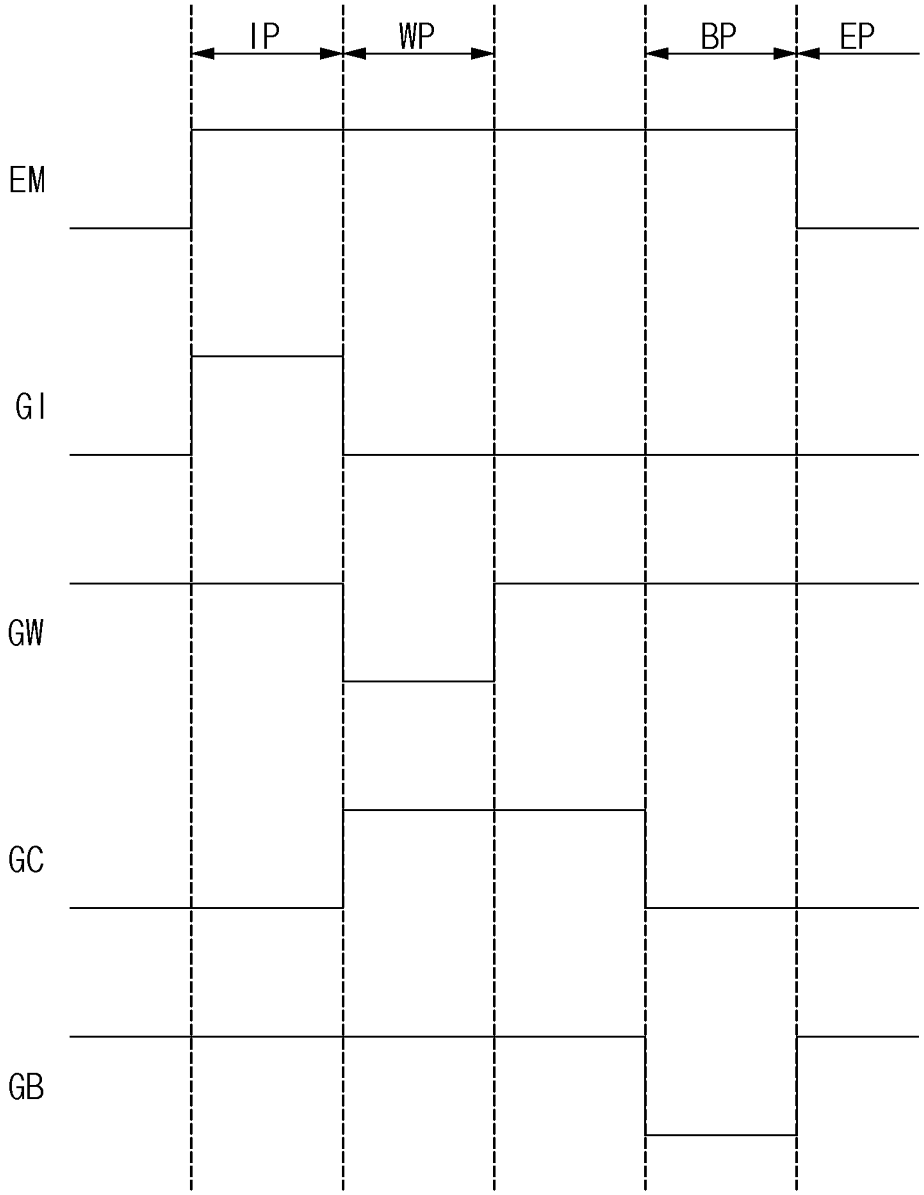
FIG. 8 is a timing diagram illustrating an example of driving a sub-pixel of the display device of FIG. 1.

FIG. 8 is a timing diagram illustrating an example of driving a sub-pixel SP of the display device of FIG. 1.

Referring to FIGS. 4, 6, and 8, in a data write period WP in which the data voltages are written, the write transistor T2, the compensation transistor T3, and the first connection transistor T9 may be turned on. In an emission period EP in which the light emitting element EE emits the light, the second connection transistor T10 may be turned on.

For example, in an initialization period IP, the initialization gate signal GI may have a high voltage level, and the first initialization transistor T4 may be turned on. Accordingly, the first initialization voltage VINT may be applied to the storage capacitor CST.

For example, in the data write period WP, the write gate signal GW and the compensation gate signal GC may have low voltage levels, the emission signal EM may have a high voltage level, and the write transistor T2, the compensation transistor T3, and the first connection transistor T9 may be turned on. Accordingly, a voltage corresponding to a sum of the data voltage and the threshold voltage of the driving transistor T1 may be applied to the first node N1 so as to be written to the storage capacitor CST (i.e., data writing and threshold voltage compensation). In addition, the compensation reference voltage VSUS may be applied to the second electrode of the storage capacitor CST.

For example, in a bias period BP, the bias gate signal GB may have a low voltage level, and the second initialization transistor T7 and the bias transistor T8 may be turned on. Accordingly, the second initialization voltage VAINT may be applied to the first electrode of the light emitting element EE to initialize the light emitting element EE. In addition, the bias voltage VBIAS may be applied to the first electrode of the driving transistor T1 to initialize a hysteresis characteristic of the driving transistor T1.

For example, in the emission period EP, the emission signal EM may have a low voltage level, and the first emission transistor T5, the second emission transistor T6, and the second connection transistor T10 may be turned on. Accordingly, the first power supply voltage ELVDD may be applied to the driving transistor T1 to generate the driving current, the driving current may be applied to the light emitting element EE, and the light emitting element EE may emit the light with a luminance corresponding to the driving current. In addition, the first power supply voltage ELVDD may be applied to the second electrode of the storage capacitor CST.

Figure 9:
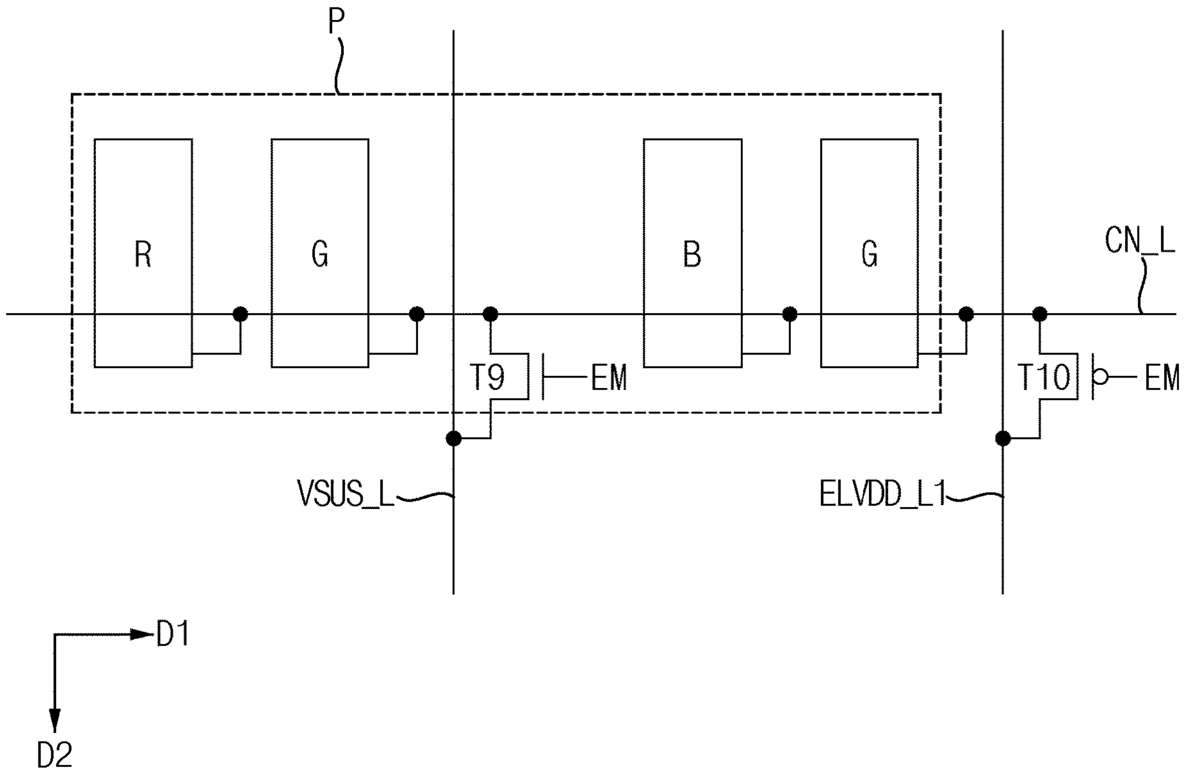
FIG. 9 is a diagram illustrating an example in which a compensation reference voltage line and a first power supply voltage line of a display device according to some embodiments are connected to sub-pixels.

FIG. 9 is a diagram illustrating an example in which a compensation reference voltage line VSUS_L and a first power supply voltage line ELVDD_L1 of a display device according to embodiments are connected to sub-pixels SP.

Since a display device according to the present embodiments has a configuration that is substantially identical to the configuration of the display device of FIG. 1 except for the structure of the pixel P and an arrangement of the compensation reference voltage line VSUS_L and the first power supply voltage line ELVDD_L1, the same reference numbers and reference signs will be used for the same or similar components, and redundant descriptions will be omitted.

In FIG. 9, a second power supply voltage line ELVDD_L2 has been omitted for convenience of description.

Referring to FIG. 9, the compensation reference voltage line VSUS_L or the first power supply voltage line ELVDD_L1 may be located between sub-pixels R, G, and B within at least one of pixels P including the sub-pixels R, G, and B For example, as shown in FIG. 9, the pixel P may have an RGBG structure. In this case, one pixel P may include one first color sub-pixel R, two second color sub-pixels G, and one third color sub-pixel B.

According to some embodiments, as shown in FIG. 9, the compensation reference voltage line VSUS_L may be located between the second color sub-pixel G and the third color sub-pixel B within one pixel P. According to some embodiments, the first power supply voltage line ELVDD_L1 may be located between the second color sub-pixel G and the third color sub-pixel B within one pixel P.

Although the pixel P has been illustrated in the present embodiments as having the RGBG structure, embodiments according to the present disclosure are not limited to the structure of the pixel P.

Figure 10:
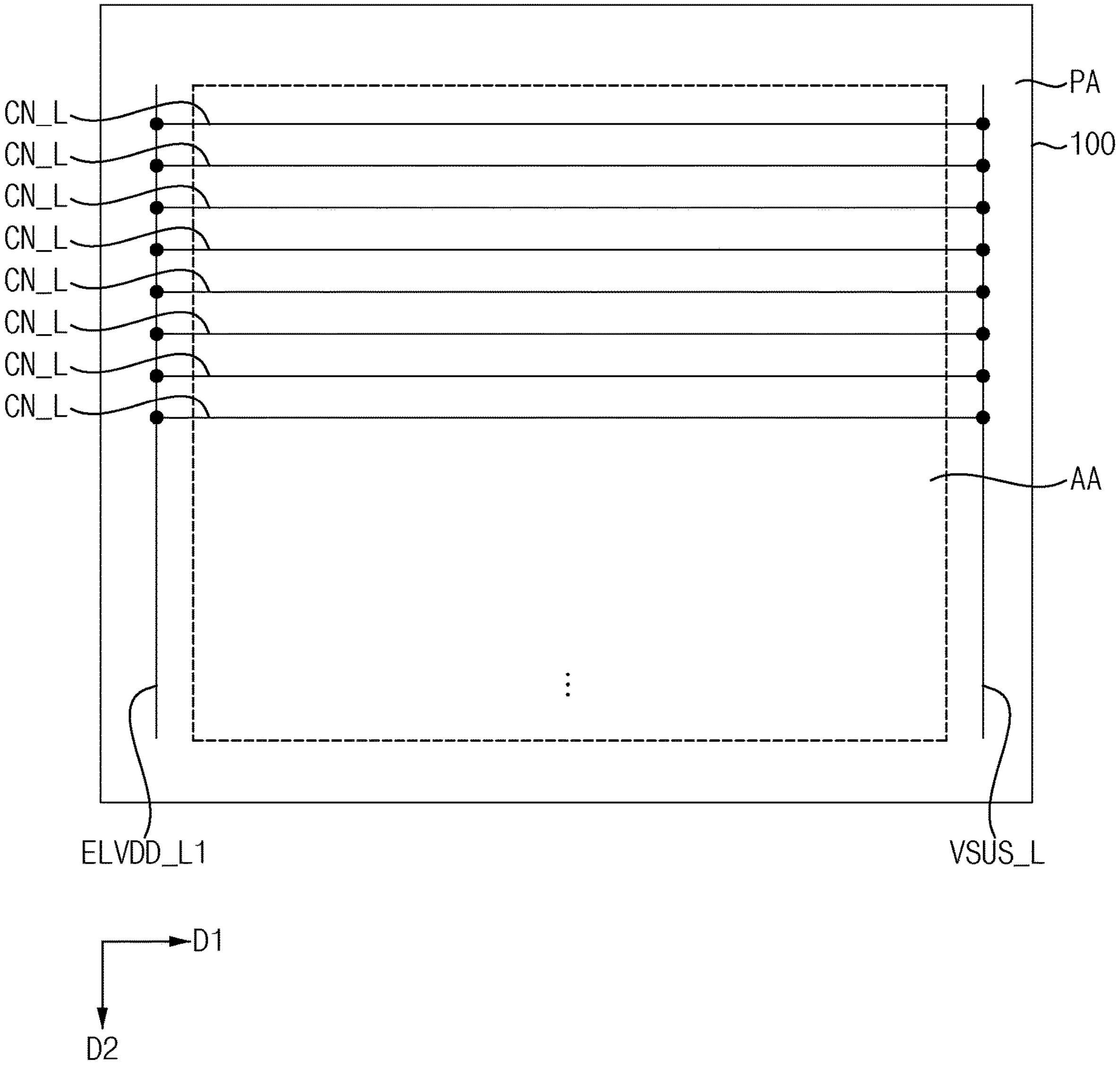
FIG. 10 is a diagram illustrating an example of a display panel 100 of a display device according to some embodiments.
Figure 11:
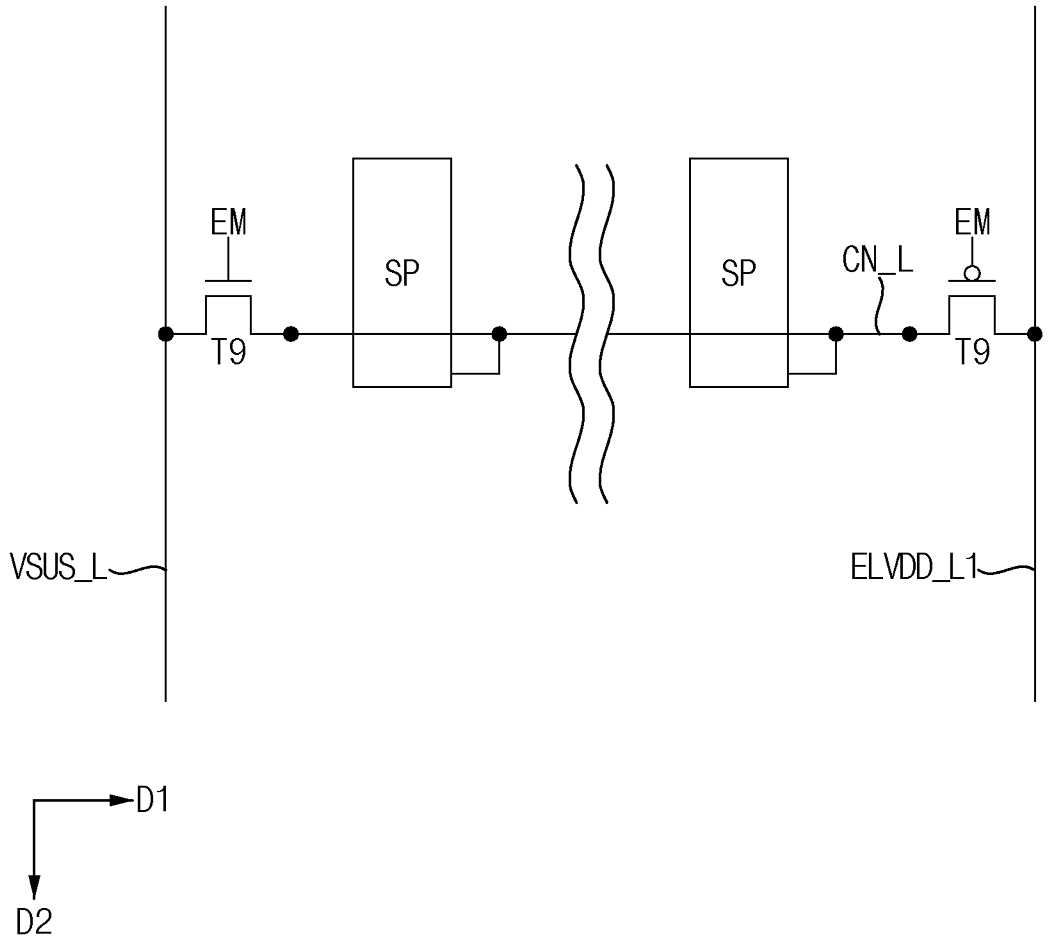
FIG. 11 is a diagram illustrating an example in which a compensation reference voltage line and a first power supply voltage line of FIG. 10 are connected to sub-pixels.

FIG. 10 is a diagram illustrating an example of a display panel 100 of a display device according to embodiments, and FIG. 11 is a diagram illustrating an example in which a compensation reference voltage line VSUS_L and a first power supply voltage line ELVDD_L1 of FIG. 10 are connected to sub-pixels SP.

Since a display device according to the present embodiments has a configuration that is substantially identical to the configuration of the display device of FIG. 1 except for the arrangement of the compensation reference voltage line VSUS_L and the first power supply voltage line ELVDD_L1, the same reference numbers and reference signs will be used for the same or similar components, and redundant descriptions will be omitted.

In FIGS. 10 and 11, a second power supply voltage line ELVDD_L2 has been omitted for convenience of description. In addition, in FIG. 10, a first connection transistor T9 and a second connection transistor T10 have been omitted for convenience of description. In other words, although a capacitor node line CN_L, the compensation reference voltage line VSUS_L, and the first power supply voltage line ELVDD_L1 have been shown in FIG. 10 as being directly connected to each other, the capacitor node line CN_L, the compensation reference voltage line VSUS_L, and the first power supply voltage line ELVDD_L1 may be connected to each other through the first and second connection transistors T9 and T10.

Referring to FIGS. 10 and 11, the compensation reference voltage line VSUS_L and the first power supply voltage line ELVDD_L1 may be located in the peripheral region PA. Accordingly, the first connection transistor T9 and the second connection transistor T10 may be located in the peripheral region PA.

For example, the compensation reference voltage line VSUS_L may be adjacent to the display region AA in a direction opposite to the first direction D1, and the first power supply voltage line ELVDD_L1 may be adjacent to the display region AA in the first direction D1.

Although it has been illustrated in the present embodiments that the compensation reference voltage line VSUS_L is adjacent to the display region AA in the direction opposite to the first direction D1 and the first power supply voltage line ELVDD_L1 is adjacent to the display region AA in the first direction D1, embodiments according to the present disclosure are not limited thereto. For example, positions of the compensation reference voltage line VSUS_L and the first power supply voltage line ELVDD_L1 may be changed. For example, both the compensation reference voltage line VSUS_L and the first power supply voltage line ELVDD_L1 may be adjacent to the display region AA in the first direction D1 or in the direction opposite to the first direction D1.

Figure 12:
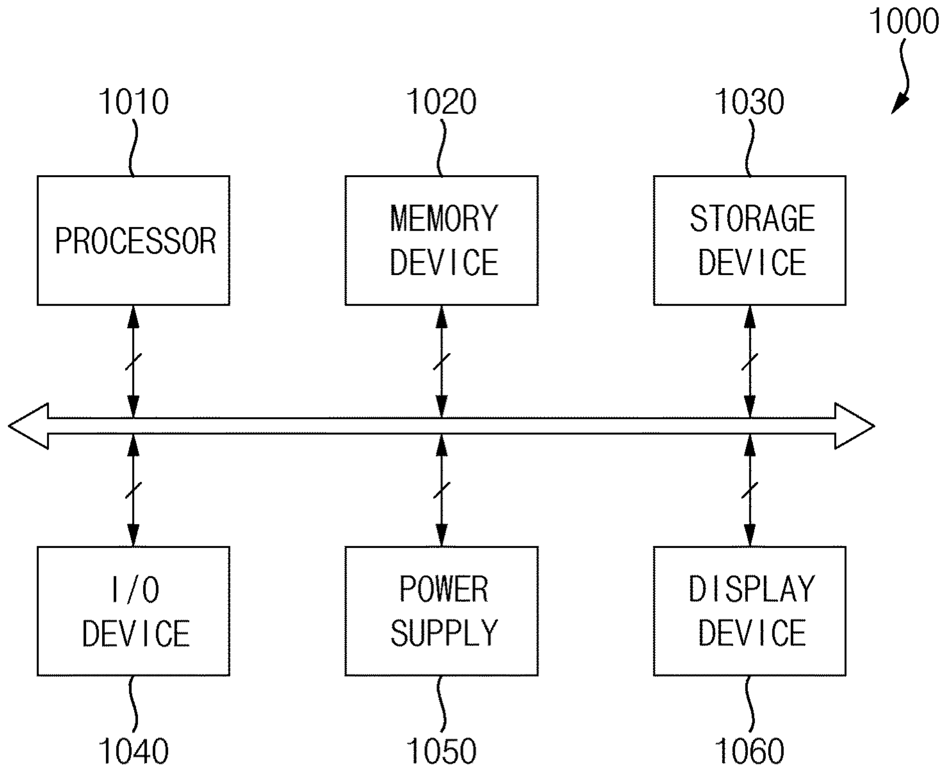
FIG. 12 is a block diagram illustrating an electronic device according to some embodiments.
Figure 13:
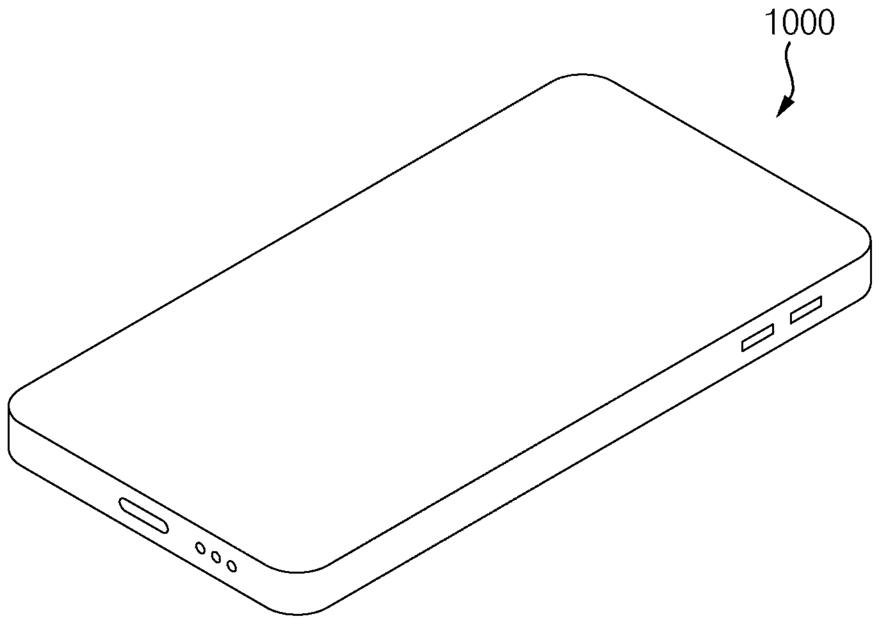
FIG. 13 is a diagram illustrating an example in which the electronic device of FIG. 12 is implemented as a smart phone.

FIG. 12 is a block diagram illustrating an electronic device 1000 according to embodiments, and FIG. 13 is a diagram illustrating an example in which the electronic device 1000 of FIG. 12 is implemented as a smart phone.

Referring to FIGS. 12 and 13, the electronic device 1000 may include a processor 1010, a memory device 1020, a storage device 1030, an input/output (I/O) device 1040, a power supply 1050, and a display device 1060. Here, the display device 1060 may be the display device of FIG. 1. In addition, the electronic device 1000 may further include a plurality of ports for communicating with a video card, a sound card, a memory card, a universal serial bus (USB) device, other electronic devices, etc. According to some embodiments, as illustrated in FIG. 13, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, etc.

The processor 1010 may perform various computing functions. The processor 1010 may be a micro processor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc and/or at least one volatile memory device such as a dynamic random access memory (DRAM) device, a static random access memory (SRAM) device, a mobile DRAM device, etc.

The storage device 1030 may include a solid state drive (SSD) device, a hard disk drive (HDD) device, a CD-ROM device, etc.

The I/O device 1040 may include an input device such as a keyboard, a keypad, a mouse device, a touch-pad, a touch-screen, etc, and an output device such as a printer, a speaker, etc. According to some embodiments, the I/O device 1040 may include the display device 1060.

The power supply 1050 may provide power for operations of the electronic device 1000. For example, the power supply 1050 may be a power management integrated circuit (PMIC).

The display device 1060 may display an image corresponding to visual information of the electronic device 1000. According to some embodiments, the display device 1060 may be an organic light emitting display device or a quantum dot light emitting display device, but is not limited thereto. The display device 1060 may be connected to other components through the buses or other communication links.

The present disclosure may be applied to a display device and an electronic device including the display device. For example, the present disclosure may be applied to a digital television, a 3D television, a smart phone, a cellular phone, a personal computer (PC), a tablet PC, a virtual reality (VR) device, a home appliance, a laptop, a personal digital assistant (PDA), a portable media player (PMP), a digital camera, a music player, a portable game console, a car navigation system, etc.

The foregoing is illustrative of embodiments and is not to be construed as limiting thereof. Although aspects of some embodiments have been described, those skilled in the art will readily appreciate that many modifications are possible in the embodiments without materially departing from the novel teachings and characteristics of embodiments according to the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims, and their equivalents.

What is claimed is:

1. A display panel comprising:

sub-pixels each including a storage capacitor configured to have a data voltage written thereto;

a capacitor node line connected to the storage capacitor of at least one of the sub-pixels;

a compensation reference voltage line configured to receive a compensation reference voltage;

a first power supply voltage line configured to receive a first power supply voltage;

a first connection transistor configured to connect the compensation reference voltage line to the capacitor node line based on an emission signal; and a second connection transistor configured to connect the first power supply voltage line to the capacitor node line based on the emission signal.

2. The display panel of claim 1, wherein the second connection transistor is configured to be turned off based on the first connection transistor being turned on, and Wherein the first connection transistor is configured to be turned off based on the second connection transistor being turned on.

3. The display panel of claim 1, wherein each of the sub-pixels includes:

the storage capacitor;

a driving transistor configured to generate a driving current;

a write transistor configured to write the data voltage based on a write gate signal;

a compensation transistor configured to diode-connect the driving transistor based on a compensation gate signal;

a first emission transistor configured to provide the first power supply voltage to the driving transistor based on the emission signal; and a light emitting element configured to receive the driving current to emit a light.

4. The display panel of claim 3, wherein the storage capacitor includes a first electrode connected to a control electrode of the driving transistor and a second electrode connected to the capacitor node line.

5. The display panel of claim 3, wherein, in a data write period in which the data voltage is written, the write transistor, the compensation transistor, and the first connection transistor are configured to be turned on.

6. The display panel of claim 3, wherein, in an emission period in which the light emitting element emits the light, the second connection transistor is configured to be turned on.

7. The display panel of claim 3, wherein each of the sub-pixels further includes:

a first initialization transistor configured to provide a first initialization voltage to the storage capacitor based on an initialization gate signal;

a second initialization transistor configured to provide a second initialization voltage to the light emitting element based on a bias gate signal;

a second emission transistor configured to provide the driving current to the light emitting element based on the emission signal; and a bias transistor configured to provide a bias voltage to the driving transistor based on the bias gate signal.

8. The display panel of claim 1, wherein at least one of pixels including the sub-pixels is between the compensation reference voltage line and the first power supply voltage line.

9. The display panel of claim 1, wherein the compensation reference voltage line or the first power supply voltage line is between the sub-pixels within at least one of pixels including the sub-pixels.

10. The display panel of claim 1, further comprising:

a display region configured to display an image; and a peripheral region adjacent to the display region, wherein the compensation reference voltage line and the first power supply voltage line are in the display region.

11. The display panel of claim 1, further comprising:

a display region configured to display an image; and a peripheral region adjacent to the display region, wherein the compensation reference voltage line and the first power supply voltage line are in the peripheral region.

12. The display panel of claim 11, wherein the first connection transistor and the second connection transistor are in the peripheral region.

13. The display panel of claim 1, further comprising:

a second power supply voltage line extending in a direction intersecting the first power supply voltage line, the first power supply voltage being applied to the second power supply voltage line.

14. A display panel comprising:

sub-pixels each including a storage capacitor to which a data voltage is written;

a capacitor node line connected to the storage capacitor of at least one of the sub-pixels;

a plurality of compensation reference voltage lines configured to receive a compensation reference voltage;

a plurality of first power supply voltage lines configured to receive a first power supply voltage, the first power supply voltage lines being arranged alternately with the compensation reference voltage lines;

a plurality of first connection transistors configured to connect the compensation reference voltage lines to the capacitor node line based on an emission signal; and a plurality of second connection transistors configured to connect the first power supply voltage lines to the capacitor node line based on the emission signal.

15. The display panel of claim 14, wherein the second connection transistors are configured to be turned off based on the first connection transistors being turned on, and wherein the first connection transistors are configured to be turned off based on the second connection transistors being turned on.

16. The display panel of claim 14, wherein each of the sub-pixels includes:

the storage capacitor;

a driving transistor configured to generate a driving current;

a write transistor configured to write the data voltage based on a write gate signal;

a compensation transistor configured to diode-connect the driving transistor based on a compensation gate signal;

a first emission transistor configured to provide the first power supply voltage to the driving transistor based on the emission signal; and a light emitting element configured to receive the driving current to emit a light.

17. The display panel of claim 16, wherein the storage capacitor includes a first electrode connected to a control electrode of the driving transistor and a second electrode connected to the capacitor node line.

18. The display panel of claim 16, wherein, in a data write period in which the data voltage is written, the write transistor, the compensation transistor, and the first connection transistors are configured to be turned on.

19. The display panel of claim 16, wherein, in an emission period in which the light emitting element emits the light, the second connection transistors are configured to be turned on.

20. A display device comprising:

a display panel including pixels each including sub-pixels;

a data driver configured to provide a data voltage to the sub-pixels;

an emission driver configured to provide an emission signal to the sub-pixels; and a timing controller configured to control the data driver and the emission driver, wherein each of the sub-pixels includes a storage capacitor configured to have the data voltage written thereto, and wherein the display panel includes:

a capacitor node line connected to the storage capacitor of at least one of the sub-pixels;

a compensation reference voltage line configured to receive a compensation reference voltage;

a first power supply voltage line configured to receive a first power supply voltage;

a first connection transistor configured to connect the compensation reference voltage line to the capacitor node line in response to the emission signal; and a second connection transistor configured to connect the first power supply voltage line to the capacitor node line in response to the emission signal.

* * * * *